(12) United States Patent
Sloan

(10) Patent No.: US 7,231,973 B2
(45) Date of Patent: Jun. 19, 2007

(54) VISCOSITY CONTROL AND FILTRATION OF WELL FLUIDS

(75) Inventor: Robert L. Sloan, Katy, TX (US)

(73) Assignee: Total Separation Solutions, LLC, Houston, TX (US)

( * ) Notice: Subject to any disclaimer, the term of this patent is extended or adjusted under 35 U.S.C. 154(b) by 285 days.

(21) Appl. No.: 11/080,838

(22) Filed: Mar. 14, 2005

(65) Prior Publication Data

US 2005/0205257 A1 Sep. 22, 2005

Related U.S. Application Data

(60) Provisional application No. 60/553,590, filed on Mar. 15, 2004.

(51) Int. Cl.
*E21B 47/00* (2006.01)
(52) U.S. Cl. ............................ 166/252.5; 175/66
(58) Field of Classification Search ............ None
See application file for complete search history.

(56) References Cited

U.S. PATENT DOCUMENTS

| | | | | |
|---|---|---|---|---|
| 4,751,887 A | * | 6/1988 | Terry et al. | 588/321 |
| 5,257,528 A | | 11/1993 | Degouy et al. | |
| 6,077,435 A | * | 6/2000 | Beck et al. | 210/636 |
| 6,474,143 B1 | | 11/2002 | Herod | |
| 6,935,426 B1 | * | 8/2005 | Rainbolt et al. | 166/279 |

* cited by examiner

*Primary Examiner*—Frank Tsay
(74) *Attorney, Agent, or Firm*—William L. Krayer

(57) ABSTRACT

Circulating completion and workover fluids used in hydrocarbon recovery are filtered after monitoring for viscosity, which frequently causes plugging of filters. A viscometer generates a signal representative of viscosity in the fluid; the signal is used by a programmable controller to divert viscous fluid from the filter, or to take other action to prevent damage to the filter. The viscometer can be used in various positions in the system.

20 Claims, 8 Drawing Sheets

VISCOSITY CONTROL AND FILTRATION OF WELL FLUIDS

RELATED APPLICATION

This application claims the full benefit of provisional application 60/553,590 filed Mar. 15, 2004.

TECHNICAL FIELD

The filtration of well treatment fluids is improved by monitoring the fluids for viscosity, and diverting the fluid when there is danger of filter clogging due to gel formation. Viscous fluid can be treated to reduce viscosity before filtering. A screen such as a wedge wire screen may be used to destroy "fish-eyes," or to shear excess polymer, in addition to separating solids from the fluid for more efficient filtration.

BACKGROUND OF THE INVENTION

In the production of oil and gas from the earth, drilling and completion fluids are commonly recirculated through a filter. The benefits of clean completion and drilling fluids have been well established. The most common method of filtering the completion and drill-in fluids has been the use of diatomaceous earth (sometimes briefly "DE") filters and cartridge filters. In either case, the conventional filters are satisfactory for removing simple contamination, but frequent shutdowns are required to remove cake from the DE filters and to replace the cartridge filters. Cake or other solids buildup is detected or assumed from an increase in pressure or a decrease in flow rate. Cake and/or other solids cannot normally be removed by backflow or otherwise from cartridge filters, which utilize porous media. The expensive cartridge filters must be replaced.

Unfortunately, caking and solids loading of the filters are not the only cause of decreased flow or increased pressure. The widespread use of gelling agents, viscosifying agents and the like in brines, drilling mud, cleaning sweeps, and other well fluids greatly increases the incidence of filter fouling. They may be introduced to the fluid in the form of dissolved powder, circulation "pills," viscosifying solutions, and by any other means or in various solutions known to the hydrocarbon production art. The gels or viscous liquids can include, most commonly, hydroxyethylcellulose (HEC), but xanthan gum, various guar gum derivatives, polyacrylamide and other synthetic water soluble polyacrylates are frequently introduced to wellbores.

When circulated gel-inducing agents reach a fluid return tank or holding tank, they can remain intact or become mixed into the completion fluids. Almost immediately as the gel-inducing agents enter a filter, they are likely to blind off a DE filter or plug a cartridge filters. This blinding off requires a total shut down and cleaning of the filter as previously described. In the case of the DE filter, a minimum of one hour is required before filtration can resume, costing valuable rig time and expense. Replacing cartridge filters is likewise time consuming and expensive as some filter pods may hold as many as fifty (50) elements per housing.

In the current practice of filtration of well treatment fluids, there is no defense against the sudden introduction of fouling polymers and gels in the fluid entering the filters. Sudden and drastic reductions in flow and increases in pressure are common and the operators of the filters must be prepared almost without notice to shut down the filters and take action to return them to working order. Such interruptions in normal procedures are very expensive, especially in off-shore rigs and other remote sites.

Another difficulty in the re-use of well treatment fluids, and the preparation of fresh ones, is that polymeric additives can be present in a concentration too high or too low. In the case of recycled fluid, where several desired additives are present also but in varying concentrations too dilute for effective use, the question of how most efficiently to adjust them while also adjusting the polymer concentration is perplexing.

SUMMARY OF THE INVENTION

The invention utilizes an in-line viscometer capable of detecting low viscosity fluids—that is, a viscosity slightly increased over the usual viscosity of the substantially gel-free fluids normally processed by the filter. A viscosity reading from the viscometer is connected to a programmable controller that is activated when a fluid exceeds the programmed threshold settings for allowable viscosities. The programmable controller can be programmed to do one or more of a) stop the pump, b) switch valves and by-pass the filter unit, diverting the contaminated fluid to a separate designated holding tank where chemical treatments will break the viscous fluid, c) provide a read-out or alarm for operating personnel, and d) re-establish filtration once fluid returns to below threshold levels.

Where large volumes of fluids are to be filtered, the viscometer is preferably located in a bypass or sampler line for a more or less continuous sample of fluid. Also, a basket strainer or similar device may be inserted in the sampler line upstream of the viscometer to protect it from damaging objects in the fluid.

My invention includes the incorporation of a screen, notably a wedge wire screen, upstream of the filter to intercept solids of a predetermined size before they meet the filter medium.

The invention will maximize filter life, maximize dirt holding capacity, save rig time & expense, reduce fluid loss due to contamination and waste, minimize disposal cost, and reduce operating costs.

The invention is particularly useful in conjunction with a filter of the type described by Asher and Hampton in U.S. Pat. No. 5,824,232 titled "Corrugated Filter Sheet Configured into a Cylindrical Filter Media having Near Circular Concentric Channels," incorporated herein by reference in its entirety. Filters of sintered plastic particles are also useful—see U.S. Pat. Nos. 6,030,558 and 6,399,188 to Smith and Fullerton, wherein rapid water quenched polyolefin pellets are compacted into a desired filter shape and fused at their points of contact to form permeable shapes and masses. Any filter satisfactory for filtering well fluids can be used.

DETAILED DESCRIPTION OF THE INVENTION

Figure 1:
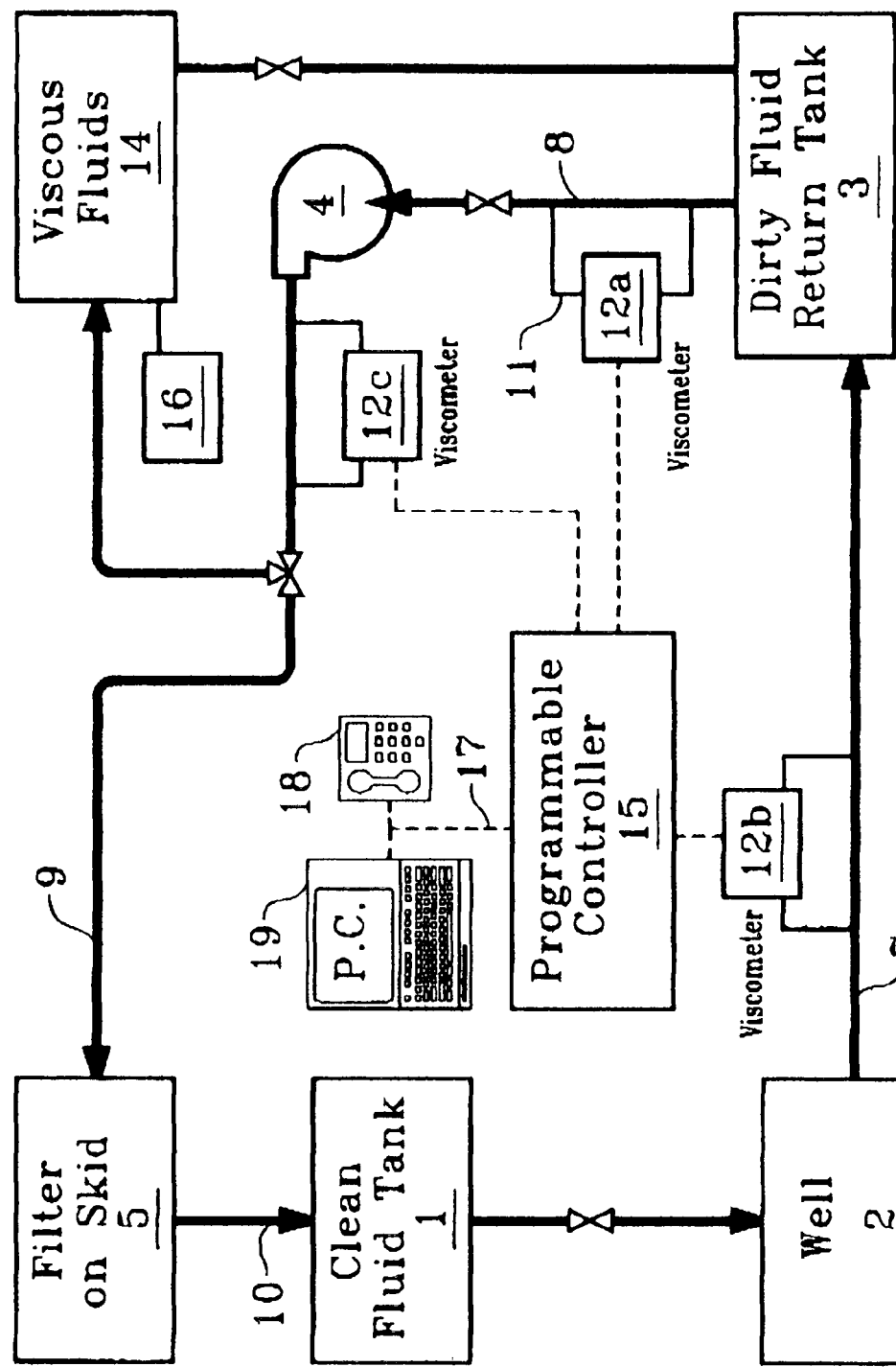
FIG. 1 is a block diagram/flow sheet of a filtration system in an oil production setting, using my invention. Some of the devices shown are optional.

In FIG. 1, the system is seen to include a clean fluid tank 1, which is the source of completion, workover, or other fluid for the well 2. The fluid flows into and out of the well, as is known in the art, through line 7 to the dirty fluid return tank 3. Pump 4 draws dirty fluid from tank 3 through line 8 and sends it through line 9 to the filter 5, where solids are removed. Filter 5 is typically mounted on a skid. After passing through the filter 5, the fluid is directed through line 10 to clean fluid tank 1 where it is held for use in the well 2, and the circulation continues until the filter 5 is clogged, which may be discerned by an increase in pressure or a decrease in flow rate. (Pressure and flow meters are not shown). Normally the filter cake will not be directly visible, as the filter 5 is enclosed in a steel vessel.

As indicated above, clogging of the filter 5 will cause circulation of fluid to be suspended, as the filter is cleaned or replaced. Clogging is accelerated by viscous fluid reaching the filter surface. Frequent and disruptive clogging is expensive and time-consuming.

FIG. 1 includes placement of a viscometer 12a and related controls. A bypass 11 has been attached to line 8, permitting a portion of the fluid in line 8 to proceed to viscometer 12a. The bypass portion of fluid proceeds through the viscometer 12a and is returned to line 9 for filtration with the main portion of the fluid sent to filter 5. The viscometer 12a thus monitors the viscosity of fluid coming from the dirty fluid return tank 3. The viscosity reading from viscometer 12a is forwarded electronically to programmable controller 15, which is programmed to take action if the viscosity exceeds a chosen threshold value. The action it takes may include any or all of (a) stop the operation of pump 4, (b) switch valves and by-pass the filter unit, thereby sending the viscous fluid to a separate designated holding (viscous fluids tank) tank 14 where chemical treatments will break the viscous fluid, (c) provide a read-out or alarm for operating personnel, and/or (d) re-establish filtration once fluid returns to below threshold levels. In addition, the high viscosity signal may be used to dilute fluid in the dirty fluid tank 3 or to dilute it elsewhere in the system upstream of the filter 5, providing a delay before the filter needs to be cleaned or changed.

Optionally, a viscometer may be placed to monitor a slip stream on line 7 (viscometer 12b) or in line 9 directly downstream from pump 4 (viscometer 12c), in each case being equipped to generate a signal representing viscosity which may be used for one or more of the purposes (a) to (d) listed above, or to supplement the signal generated by viscometer 12a. In addition, if a reading in viscometer 12b is high, the fluid in line 7 may be directed immediately to viscous fluid tank 14 or elsewhere; by this procedure, the dirty fluids return tank will not be full of gel-producing material when the threshold reading is reached; rather, the liquid in the dirty fluids tank 3 would still be satisfactory for sending to the filter for some time after the point when undesirably viscous fluid begins coming from the well.

The viscosity signal may also be used to control the feeding of calcium hypochlorite, sodium hypochlorite, or other material from container 16 to the viscous fluid tank 14. These materials are known to be effective in reducing the molecular weight of hydroxyethylcellulose, a common viscosifying agent, but any chemical agent useful for reducing the viscosity of the viscous fluid diverted to viscous fluid tank 14 may be used. Programmable controller 15 can deliver such de-viscosifiers to viscous fluid tank 14 at a rate more or less proportional to the amount of viscous fluid diverted to it. Of course, feeding of the de-viscosifying agents to tank 14 could be accomplished manually or by mechanical means independent of the programmable controller.

Except for line 17 connecting programmable controller 15 with computer 19 and phone 18, the electrical connections in FIG. 1 do not have reference numbers as it should be understood that any system, wired or unwired, capable of performing the above described functions may be used.

Figure 2:
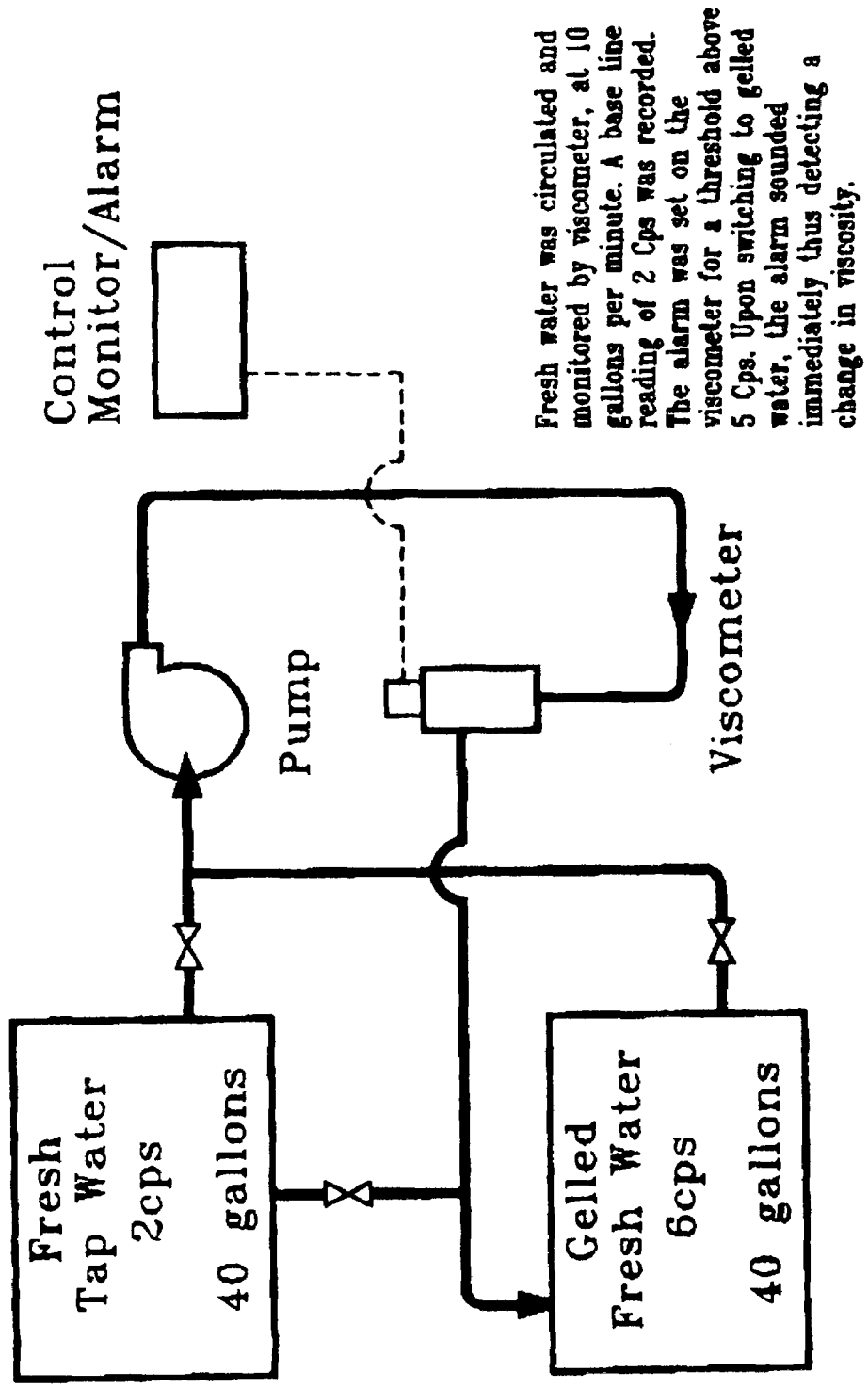
FIG. 2 is a block diagram/flow sheet of a laboratory test useful in our invention.

FIG. 2 shows the laboratory setup for a test using 5 Cps as the alarm threshold. Such an alarm or related control signal can be used to divert the unacceptably viscous fluid to the contaminated fluids tank 14 or otherwise protect the filter.

To perform in an offshore facility or other harsh environment, the viscometer should contain no moving parts to wear or bind. It should be built out of 316 stainless steel, easy to clean and with low maintenance. The viscometer should be capable of pressures up to 200 psi and operate in temperatures up to 250° F. The viscosity range should be from 2 cP to 3000 cP or equivalent cup-seconds. The main focus should be on a meter that is designed for low viscosity fluid and operates at low hertz without fluid interference or impedance. Viscometers which operate using vibrating forks or rotating bobs but are generally not sensitive to low viscosity fluids and are therefore only applicable to high viscosity readings. The viscometer should be chosen with the desired threshold or cutoff viscosity in mind, as well as the conditions of use.

Figure 3:
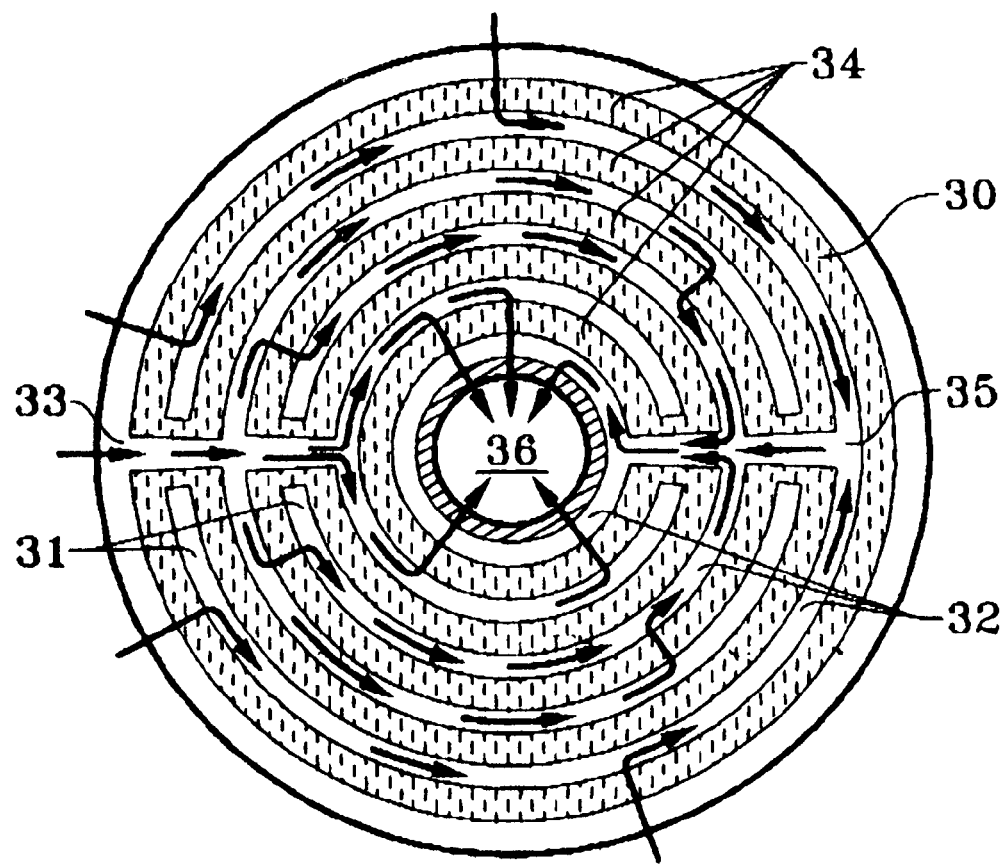
FIG. 3 is a view of a filter useful in my invention.

FIG. 3 is taken from FIG. 9 of Asher and Hampton U.S. Pat. No. 5,824,232, which describes a filter I have found to be particularly useful in my invention. FIG. 3 is a schematic of the bottom seal member, showing the flow of fluid in the cylindrical housing of the filter. To paraphrase the general description in that patent, it comprises a filter sheet 30 formed of a rigid, corrugated, perforated material, the filter sheet forming a generally cylindrical filter medium having a plurality of near circular concentric channels 31 and 32, wherein the filter medium defines first and second radial flow paths interconnecting the channels and radially extending across the filter. Flow may be in either direction, and backwashing is readily accomplished. As illustrated in FIG. 3, the unfiltered fluid enters at inlet conduit 33, flows between the layers 34 of filter media, through the filter media (solids of a specified size will be separated anywhere on the surface of the filter media layers 34) to outlet channels 35, and into filtered media outlet conduit 36. Although this type of filter has proven to be excellent in our invention, I am not limited to this particular type of filter. Any filter capable of handling the quantities of fluid to be expected can be used.

Figure 4A:
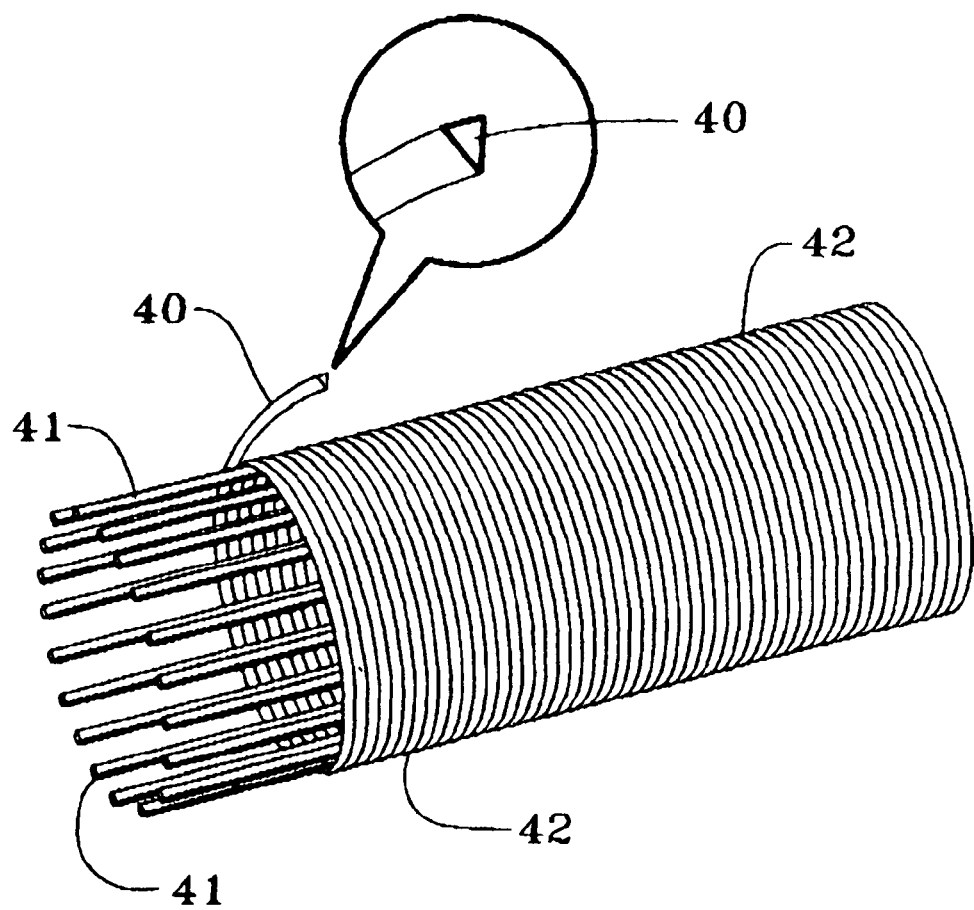
FIGS. 4a–4e illustrate a wedge wire screen useful in my invention.
Figure 4B:
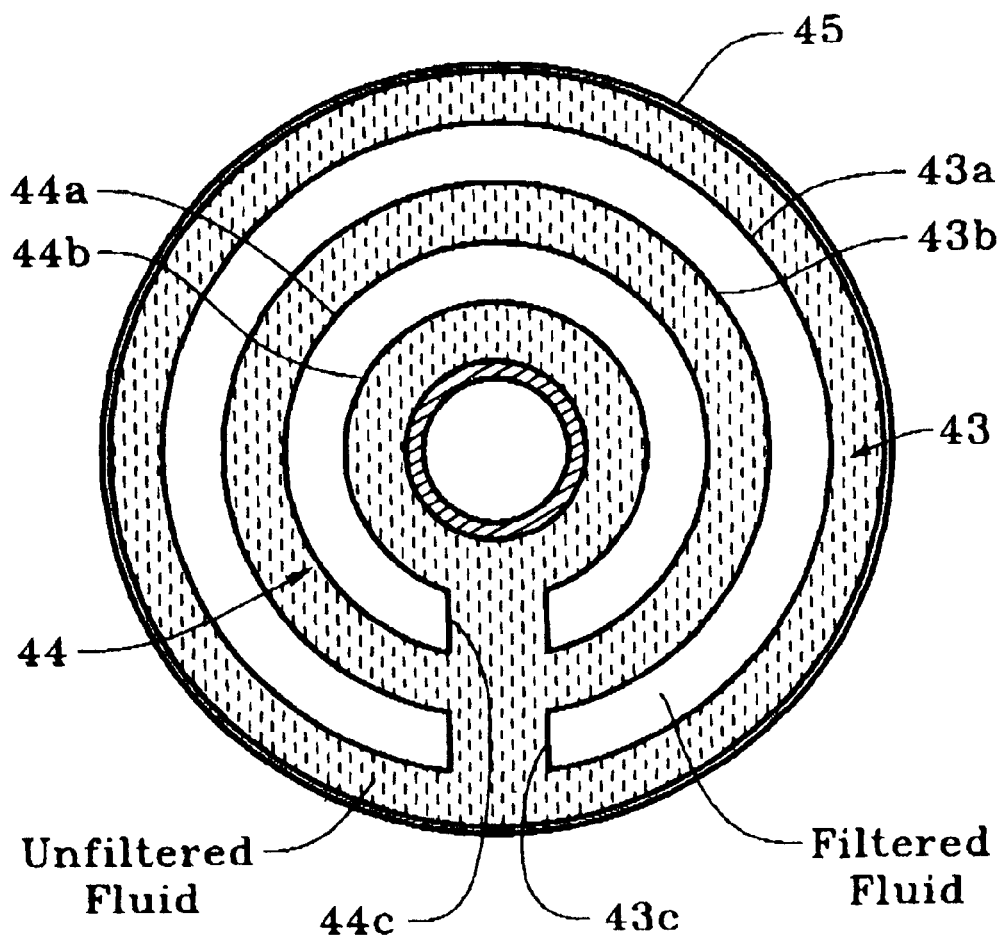

FIG. 4a is a detail of the construction of a wedge wire screen useful in my invention, which can be placed in various positions in the system. As is known in the art, a screen can be made by winding a wedge wire 40, an extruded, triangular section wire, around a cage of parallel ribs 41, fixing them to form a space or slot 42 between them, usually by welding. FIG. 4b is a diagrammatic overhead view of the construction of wedge wire screen I prefer to use. Here, there are two C-shaped screen units 43 and 44 set approximately concentrically in a cylindrical housing 45. Each screen unit 43 and 44 has a convex face 43a and 44a, and a concave face 43b and 44b, both of which are to be contacted by unfiltered fluid, represented here by the shaded areas. Each screen unit 43 and 44 also has end caps 43c and 44c, which may be impervious—that is, it need not be of wedge wire. Together with the concave and convex faces, the end caps form an enclosure. Unfiltered fluid enters the cylindrical housing 45 through inlets not shown (from anywhere through the housing 45, or its top) and passes through both the convex and concave sides of the screen units, leaving solids of the undesired size behind. Filtered fluid within the screen units may then be removed through outlets 52 as illustrated in FIGS. 4d and 4e. It should be noted that both the convex faces 43a and 44a, and the concave faces 43b and 44b of the screen units are constructed so that the flat side of the wedge wire contacts the unfiltered fluid. One of the features of wedge wire screens is that a solid particle will generally not become lodged in a slot 42 because the anterior of the slot is divergent, i.e. between two triangular shapes. Thus the construction of the concave faces 43b and 44b is opposite that shown in FIG. 4a, the wedge wire being laid on the inside of ribs 41 rather than the outside.

Figure 4C:
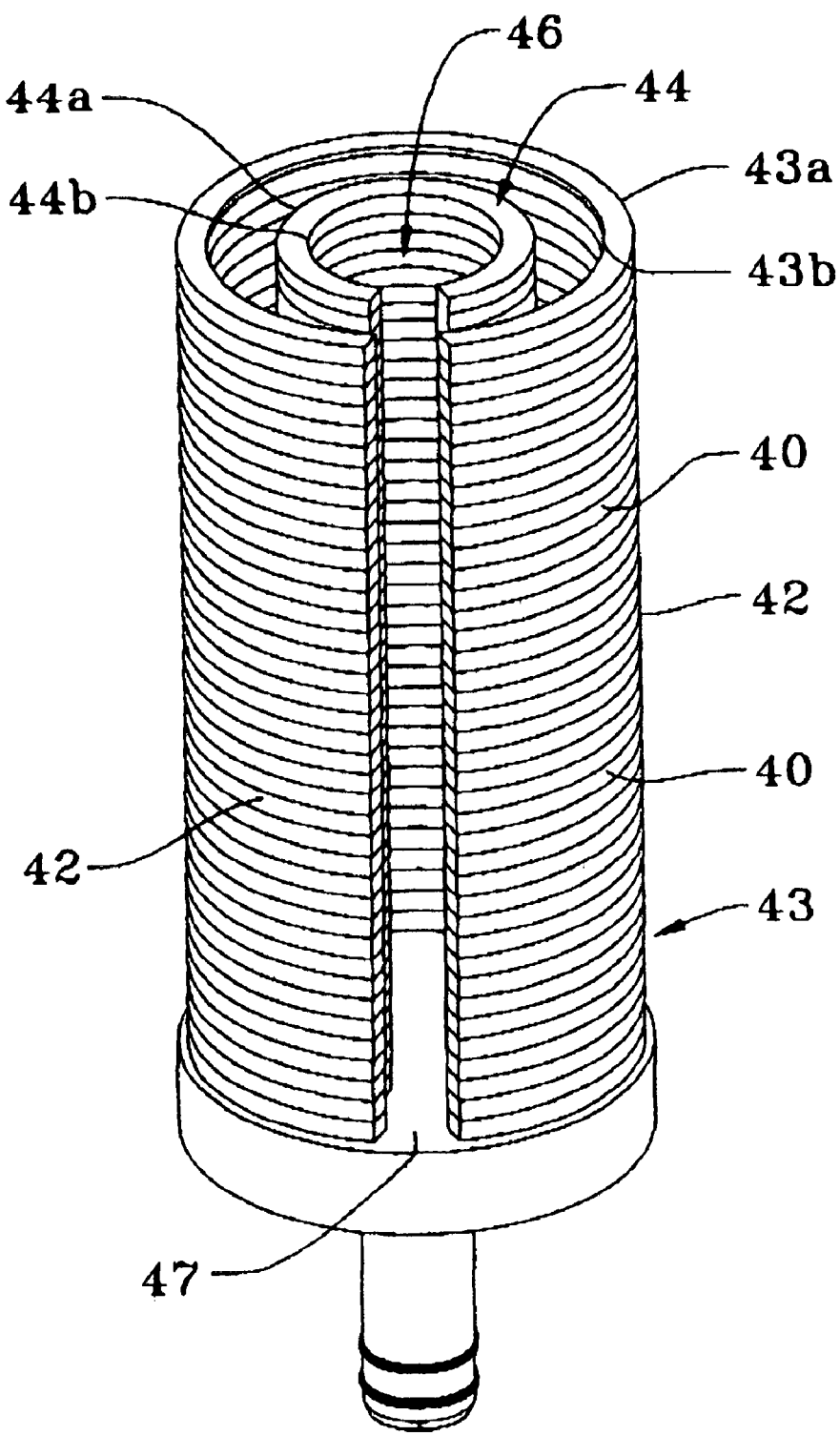
Figure 4D:
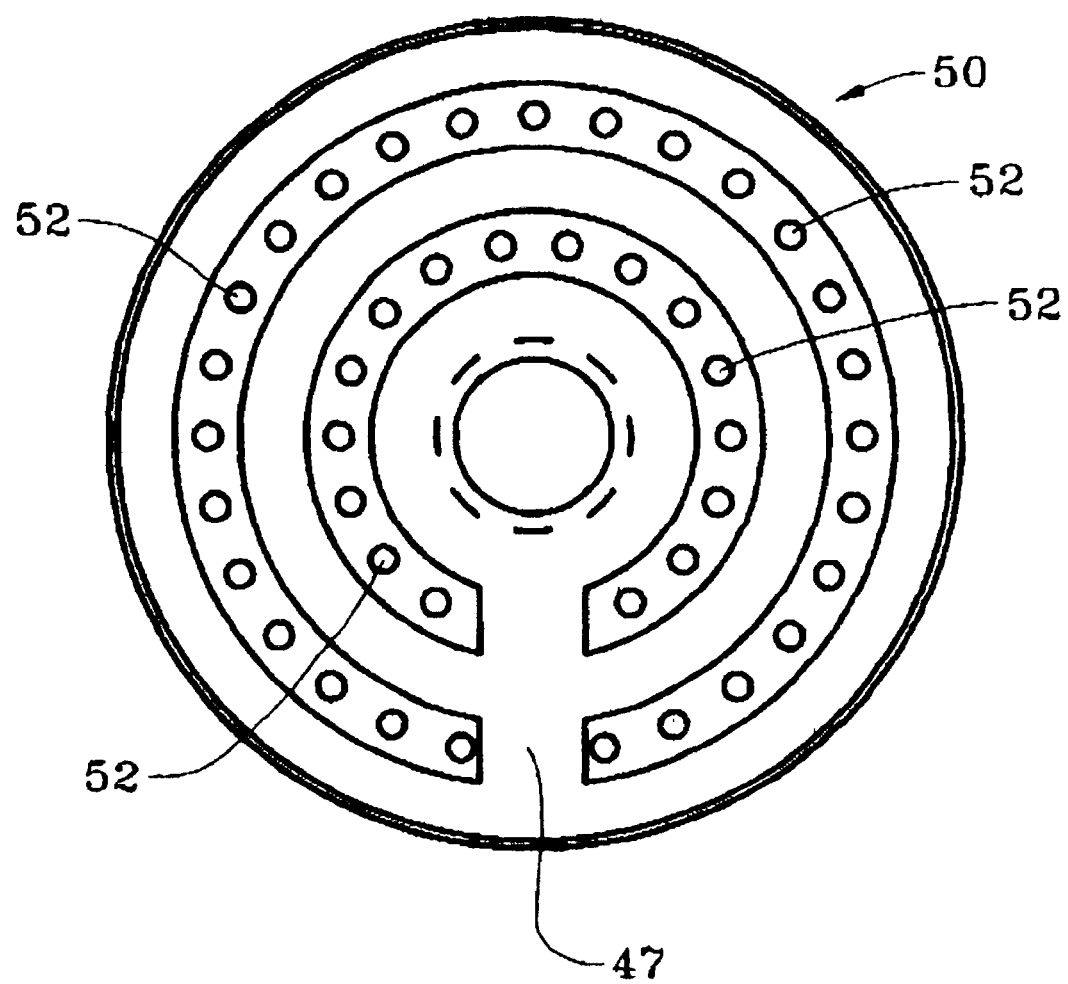
Figure 4E:
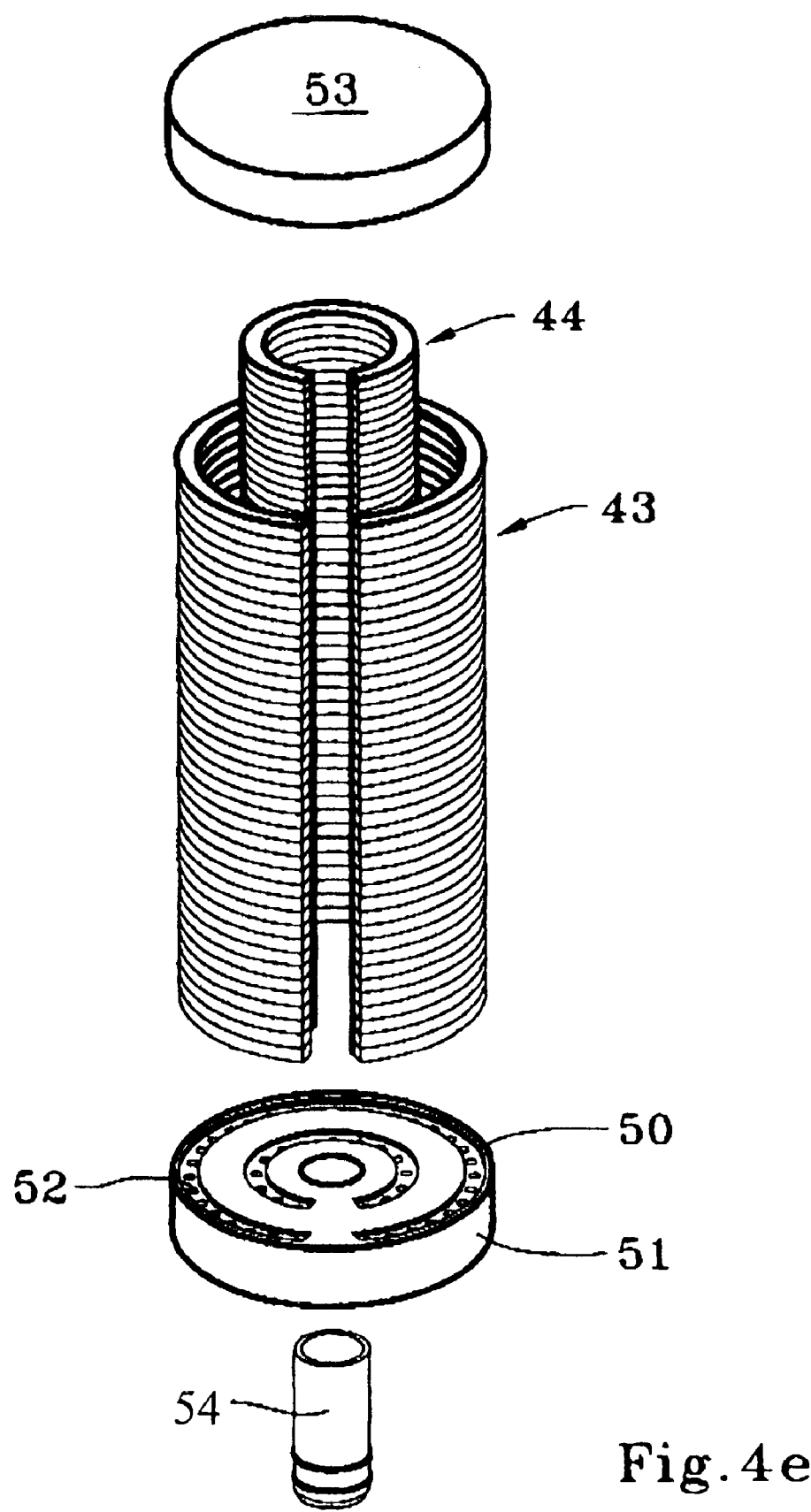

FIG. 4c is a perspective of the two-screen configuration, without the housing 45. Wedge wires form the entire convex (43a and 44a) and concave (43b and 44b) faces of the C-shaped screen units. Slots 42 of the desired dimension are established between wedge wires 40. In the configuration of FIG. 4c, C-shaped screen unit 43 is shown with its opening 46 aligned with opening 47 of C-shaped screen unit 44, but this is not essential—that is, screen unit 43 could be turned, for example 180 degrees so that opening 46 is oriented away from opening 47 of screen unit 44. Referring to FIGS. 4d and 4e, the top plate 50 of reservoir 51 is seen to have outlets 52 for filtered fluid having passed through the wedge wire screens of screen units 43 and 44. Housing 45 and the two screen units 43 and 44 are sealed to top plate 50. Filtered fluid collects in reservoir 51 and is removed through pipe 54. FIG. 4e is an exploded view of the top seal 53, screen units 43 and 44, reservoir 51 with its top plate 50, and pipe 54. Housing 45 and the inlet for the dirty fluid are not shown in this view.

A screen such as depicted in FIGS. 4a–4e, or any other effective screen, may advantageously be placed immediately upstream of a viscometer to protect it from solids, or just ahead of the filter. In addition to removing potentially damaging solids, the wedge wire screen can perform the function of breaking up "fish-eyes" or other localized gel blobs, as well as shearing a viscous fluid, sometimes delaying the point at which the fluid is diverted or at which the pump is shut down. The wedge wire screen may be placed, for example, anywhere in lines 8 or 9.

The viscometer may be operated continuously or intermittently, and the control signal(s) may also be generated either continuously or intermittently.

The invention claimed is:

1. Method of circulating fluid through at least one well comprising injecting said fluid in said at least one well, recovering said fluid from said at least one well, placing said fluid in a dirty fluid tank, pumping said fluid from said dirty fluid tank to a filter, filtering said fluid, and returning said fluid to said at least one well, including the step of monitoring said fluid for viscosity and diverting said fluid from said filter if said viscosity exceeds a predetermined value.

2. Method of claim 1 wherein said monitoring of said viscosity is performed between said dirty fluid tank and said filter.

3. Method of claim 1 wherein said monitoring for viscosity is performed on a slip stream sample of said fluid taken between said dirty fluid tank and said filter.

4. Method of claim 3 wherein said sample in said slip stream is passed through a screen to remove objects potentially damaging to said viscosity monitoring.

5. Method of claim 1 wherein said monitoring of said viscosity is conducted intermittently.

6. Method of claim 1 wherein said monitoring of said fluid for viscosity is performed between said well and said dirty fluid tank.

7. Method of claim 1 wherein said filter comprises a filter sheet formed of a rigid, corrugated, perforated material, said filter sheet forming a cylindrical filter medium having a plurality of near circular concentric channels, and wherein said filter medium defines a first and second radial flow path interconnecting said channels and radially extending across the filter.

8. Method of claim 1 wherein said filter comprises a permeable mass of sintered polyolefin particles.

9. Method of claim 1 including generating a signal representative of viscosity of said fluid, and diverting said fluid from said filter in response to a predetermined maximum viscosity value as represented by said signal.

10. Method of claim 9 wherein said fluid is diverted to a viscous fluid holding tank.

11. Method of claim 10 followed by treating said fluid in said viscous fluid holding tank to reduce the viscosity thereof.

12. Method of claim 11 wherein said treating of said process water comprises introducing a viscosity-reducing agent to said viscous fluid holding tank as a function of the viscosity of said viscous fluid.

13. Method of claim 12 wherein said viscosity-reducing agent comprises an alkali metal or alkaline earth metal hypochlorite.

14. Method of claim 1 wherein said monitoring for viscosity is performed on a slip stream of said fluid.

15. Method of claim 14 wherein said monitoring is preceeded by screening said slip stream to remove objects potentially damaging to said viscosity monitoring step.

16. Method of claim 15 wherein said screening is accomplished by a wedge wire screen.

17. Method of managing the viscosity of a well fluid circulating through a well and a filter comprising measuring the viscosity of said fluid prior to passing it through said filter, generating a signal representative of said viscosity, and, in response to said signal, performing at least one of (a) stop said fluid circulation through said well and said filter, (b) divert flow of said fluid from said filter to a holding tank, (c) provide a read-out or alarm, and (d) treat said fluid to reduce its viscosity.

18. Method of claim 17 following step (d) including the further step of returning the fluid having reduced viscosity to said well.

19. Method of claim 17 including passing said well fluid through a screen to remove solids prior to measuring viscosity.

20. Apparatus useful for managing the viscosity of a circulating well fluid comprising: (a) a clean fluid tank, (b) a dirty fluid tank, (c) a viscous fluid holding tank, (d) at least one pump for circulating said fluid from said clean fluid tank to a well, from said well to said dirty fluid tank, from said dirty fluid tank to a filter, and from said filter to said clean fluid tank, (e) a viscometer positioned to monitor viscosity of said fluid prior to entering said filter, said viscometer being capable of generating a signal representative of said viscosity, and (f) a programmable controller responsive to said signal for diverting said fluid from said filter if said viscosity is in excess of a predetermined value.

* * * * *